United States Patent [19]
Choo

[11] Patent Number: 6,114,894
[45] Date of Patent: Sep. 5, 2000

[54] OPTICAL RECORDING/REPRODUCING APPARATUS HAVING 3T-COMPONENT COMPENSATING CIRCUIT

[75] Inventor: Chang-Yeob Choo, Kyungki-do, Rep. of Korea

[73] Assignee: SamSung Electronics Co., Ltd., Kyungki-do, Rep. of Korea

[21] Appl. No.: 09/087,996

[22] Filed: Jun. 1, 1998

[30] Foreign Application Priority Data

May 30, 1997 [KR] Rep. of Korea ............... 97-22278

[51] Int. Cl.[7] .................................................. G06G 7/12
[52] U.S. Cl. ...................... 327/362; 327/100; 327/165; 369/44.32; 369/59
[58] Field of Search ................................. 327/362, 165, 327/100, 307; 369/59, 44.32

[56] References Cited

U.S. PATENT DOCUMENTS

| | | | |
|---|---|---|---|
| 5,086,421 | 2/1992 | Takeishi | 369/59 |
| 5,253,240 | 10/1993 | Yanagawa | 369/44.32 |
| 5,490,126 | 2/1996 | Furumlya et al. | 369/59 |
| 5,500,842 | 3/1996 | Dunlavy | 369/48 |
| 5,502,698 | 3/1996 | Mochizuki | 369/44.32 |
| 5,550,797 | 8/1996 | Kimura et al. | 369/44.41 |
| 5,623,466 | 4/1997 | Itonaga | 369/44.32 |
| 5,659,535 | 8/1997 | Kimura et al. | 369/59 |
| 5,706,267 | 1/1998 | Kimura et al. | 369/59 |
| 5,710,750 | 1/1998 | Tachibana | 369/59 |
| 5,719,847 | 2/1998 | Tateishi et al. | 369/54 |
| 5,726,963 | 3/1998 | Ohta | 369/124.02 |
| 5,737,371 | 4/1998 | Jaquette | 375/357 |

*Primary Examiner*—Dinh T. Le
*Attorney, Agent, or Firm*—Robert E. Bushnell, Esq.

[57] ABSTRACT

In an optical recording/reproducing apparatus having a 3T-component compensating circuit, among the level-shifted radio frequency signals shifted during a reproduction of recorded data from an optical disc, the level of a 3T component is compensated for, so that error correction may be carried out by a digital signal processor. The optical recording/reproducing apparatus having a 3T-component compensating circuit for reproducing recorded data includes a peaking circuit for amplifying a 3T component from among RF signals outputted from a pickup. A compensating circuit compensates a level-shifted 3T component shifted during the amplification by the peaking circuit. A digital signal processor carries out error correction for the 3T component after the compensation by the compensating circuit. The shifting of the 3T component of the output RF signals of the pickup is compensated for, so that the digital signal processor can carry out the optimum error correction, and so that the recorded images and audio data can be correctly reproduced.

6 Claims, 4 Drawing Sheets

OPTICAL RECORDING/REPRODUCING APPARATUS HAVING 3T-COMPONENT COMPENSATING CIRCUIT

CLAIM OF PRIORITY

This application makes reference to, incorporates the same herein, and claims all benefits accruing under 35 U.S.C. §119 from an application for OPTICAL RECORDING/REPRODUCING APPARATUS HAVING 3T-COMPONENT COMPENSATING CIRCUIT earlier filed in the Korean Industrial Property Office on May 30, 1997 and there duly assigned Serial No. 22278/1997.

BACKGROUND OF THE INVENTION

1. Field of the Invention

The present invention relates to an optical recording/reproducing apparatus. More specifically the present invention relates to an optical recording/reproducing apparatus having a 3T-component compensating circuit, in which among the level-shifted radio frequency signals shifted during a reproduction of the recorded data from an optical disc, the level-shift of the 3T component is compensated for, so that error corrections may be carried out by a digital signal processor.

2. Description of the Related Art

Generally, the optical disc which is used in a CDP (compact disc player), LDP (laser disc player) or DVD (digital versatile disc) is not damaged by external factors such as temperature, humidity and the like. Further, the data which is recorded on the optical disc can be reproduced clearly by laser beams, and therefore, its use has widely propagated.

In the optical recording/reproducing apparatus, the video and audio data recorded on the disc are reproduced by a pickup by using laser beams, and the reproduced data is outputted through a monitor and a speaker.

Under this condition, the radio frequency signals (RF signals) which are reproduced by the pickup include a frequency component corresponding to the pitches of 3T–11T of the optical disc. The digital signal processing section carries out error corrections by utilizing the frequency component corresponding to the 3T pitch (to be called a "3T component" below) which contains the largest amount of data.

In order to carry out the error corrections by utilizing the 3T component by the optical pickup, the 3T component has to be amplified, and the circuit for this amplification is a peaking circuit.

If accurate error corrections are to be carried out, the duty cycle of the output wave of the peaking circuit has to be maintained at 50%.

In an earlier arrangement, a peaking circuit containing an operational amplifier has been used. The peaking circuit amplifies the sinusoidal waves input thereto but unfortunately the resultant output is level-shifted so as to no longer have a 50% duty cycle.

Accordingly, a digital signal processor can not properly error correct the signal output from the peaking circuit.

The following patents each disclose features in common with the present invention but do not teach or suggest the specifically recited optical recording/reproducing apparatus having a 3T component compensating circuit in accordance with the present invention: U.S. Pat. No. 5,719,847 to Tateishi et al., entitled Optical Disk Player Having Wave form Distortion Compensating Function, U.S. Pat. No. 5,623,466 to Itonaga, entitled Optical Pickup Apparatus With Skew Error Control And Optical Information Recording And/Or Reproducing Apparatus Using The Same, U.S. Pat. No. 5,500,842 to Dunlavy, entitled Method And Apparatus For Correcting Distortion In Compact Disc Recording And Playback System, U.S. Pat. No. 5,502,698 to Mochizuki, entitled Automatic Attitude Correcting System For Optical Disc Device, U.S. Pat. No. 5,550,797 to Kimura et al, entitled Optical Reproduction Signal Processing Circuit For Producing An RF Signal And A Servo Signal With A High Signal To Noise Ratio Even Though The RF Signal Component And The Servo Signal Component Partially Overlap In Frequency Distribution, U.S. Pat. No. 5,253,240 to Yanagawa, entitled Tracking Error Detecting System For Removing An Offset In An Optical Disk Player, U.S. Pat. No. 5,737,371 to Jaquette, entitled Realignment Of Data Stream From An Optical Disk, U.S. Pat. No. 5,706,267 to Kimura et al, entitled Method And Apparatus For Retrieving Data From A Storage Device, U.S. Pat. No. 5,710,750 to Tachibana, entitled Optical Disc Device, U.S. Pat. No. 5,726,963 to Ohta, entitled Information Reproduction Apparatus Including A Phase Compensation Circuit For Eliminating The Influence Of AC-Coupling, U.S. Pat. No. 5,659,535 to Kimura et al., entitled Method For Retrieving Data From A Storage Device, and U.S. Pat. No. 5,675,569 to Yamaguchi et al., entitled Readback Circuit For An Optical Information Reading And Recording Apparatus.

SUMMARY OF THE INVENTION

The present invention is intended to overcome the above described disadvantages of the earlier technique.

Therefore it is an object of the present invention to provide an optical recording/reproducing apparatus having a 3T-component compensating circuit, in which among the level-shifted radio frequency signals shifted during a reproduction of the recorded data from an optical disc, the level-shift of the 3T component is compensated for, so that the optimum error corrections may be carried out by a digital signal processor, thereby making it possible to correctly reproduce images and audio data.

In achieving the above object, the optical recording/reproducing apparatus having a 3T-component compensating circuit for reproducing recorded data according to the present invention includes: a peaking circuit for amplifying a 3T component from among RF signals outputted from a pickup; a compensating circuit for compensating for a level-shifted 3T component shifted during the amplification by the peaking circuit; and a digital signal processor for carrying out error corrections for the 3T component after compensation by the compensating circuit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
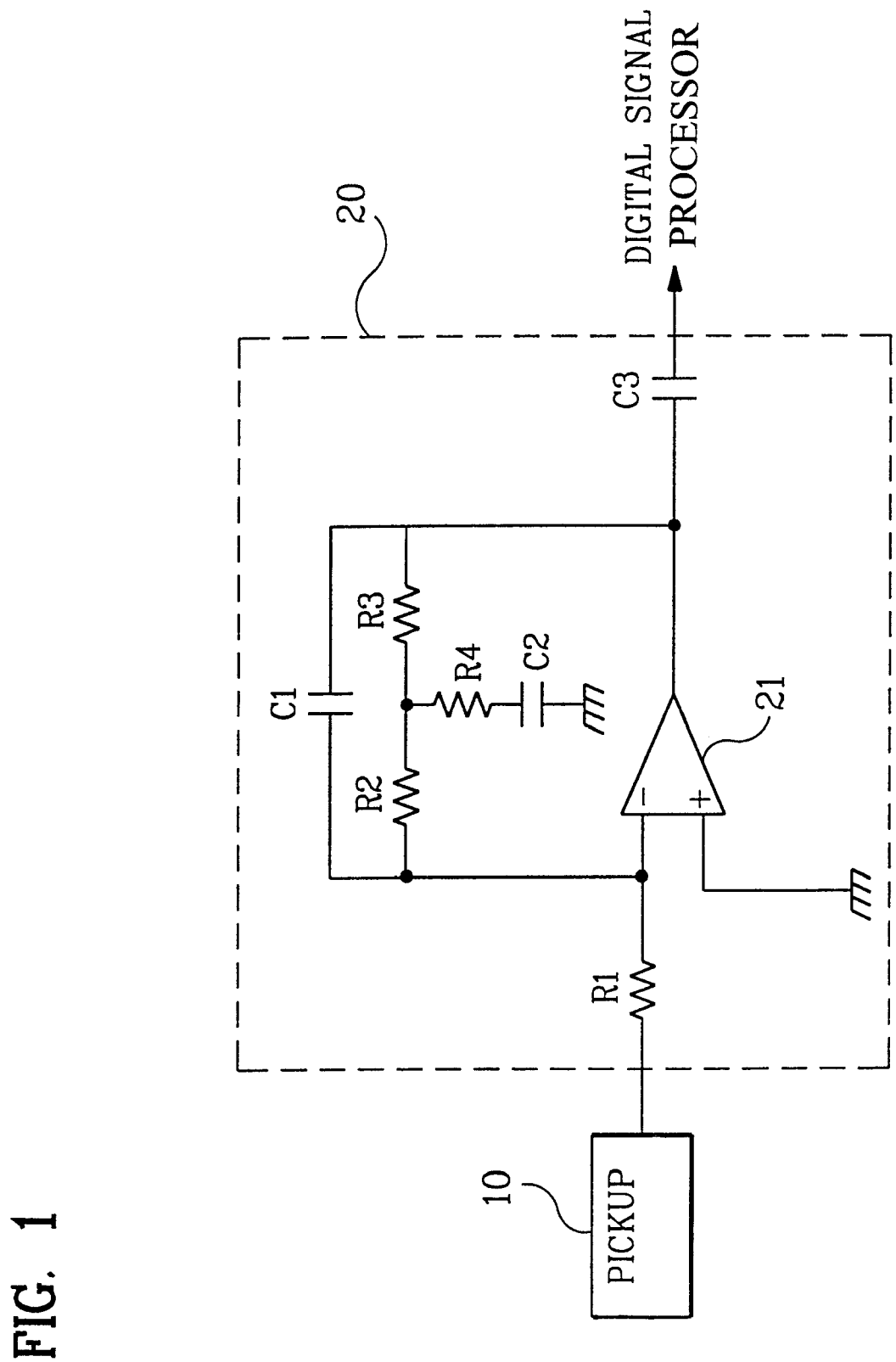
FIG. 1 illustrates an example of peaking circuit which uses an arithmetic amplifier.

FIG. 1 illustrates an example of a peaking circuit which uses an operational amplifier.

As shown in this drawing, in the peaking circuit 20, the RF signals which have been reproduced by a pickup 10 are inputted through a resistor RI into an inverting terminal (−) of an operational amplifier 21. The amplified signals are outputted through a capacitor C3 which is connected to an output terminal of the operational amplifier 21.

A non-inverting terminal (+) of the operational amplifier 21 is grounded.

A plurality of resistors R2, R3 and R4 are connected between the inverting terminal (−) and the output terminal of the operational amplifier 21 in a T form, thereby forming an amplifying circuit. In parallel to this circuit, a noise removing capacitor C1 is connected.

The peaking circuit 20 constituted as above will be described as to its operations referring to FIG. 2.

The images and audio data recorded on the optical disc are reproduced by the optical pickup 10 to be outputted as RF signals. The RF signals are supplied through the resistor RI to the inverting terminal (−) of the operational amplifier 21, and they are amplified to a certain level by passing through the amplifying circuit which includes the resistors R2, R3 and R4 and the capacitor C2.

During the amplifying process, new noise may be generated, or the existing noise may be amplified.

Figure 2:
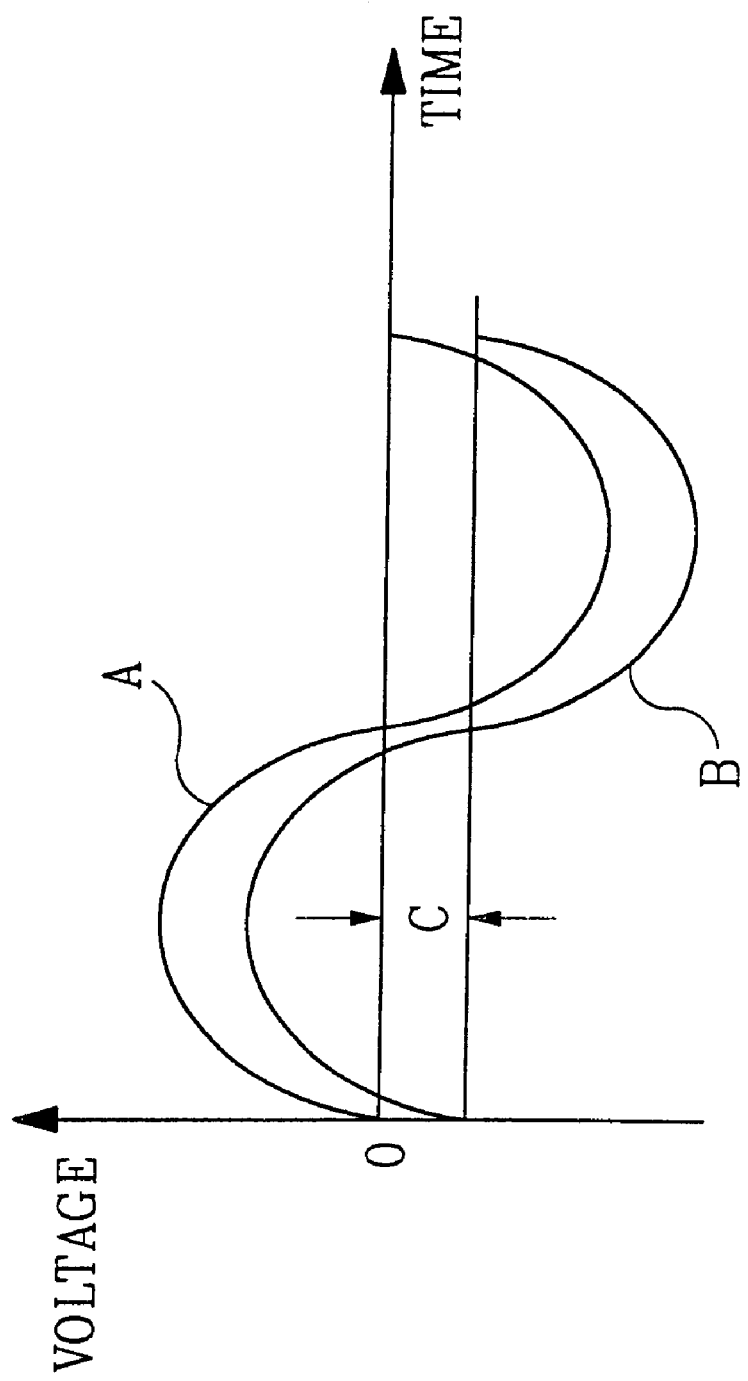
FIG. 2 is wave patterns of the amplified 3T component from among the RF signals.

However, this noise is removed by the capacitor C1, with the result that amplified sinusoidal waves as shown in the wave pattern B of FIG. 2 are outputted from the output terminal of the operational amplifier 21 instead of the 50% duty cycle wave shown by the wave pattern A of FIG. 2.

As described above, the RF signals which have been amplified by the peaking circuit 20 are inputted into a digital signal processor (not shown in the drawings). The digital signal processor carries out error corrections for the incoming RF signals.

However, as shown in FIG. 2, among the RF signals which are amplified and outputted by the peaking circuit 20, the level of the 3T component is shifted as shown in the wave pattern C of FIG. 2 during the noise removing process.

Therefore, the output wave pattern (B of FIG. 2) cannot satisfy the duty cycle of 50%, that is, cannot satisfy the ratio of 1:1.

Therefore, even if the error corrections are carried out by the digital signal processor 20, the lowered reproduction inaccuracy for the images and audio data remains the same.

The optical recording/reproducing apparatus having a 3T-component compensating circuit according to the present invention will be described in detail referring to FIGS. 3 and 4.

Figure 3:
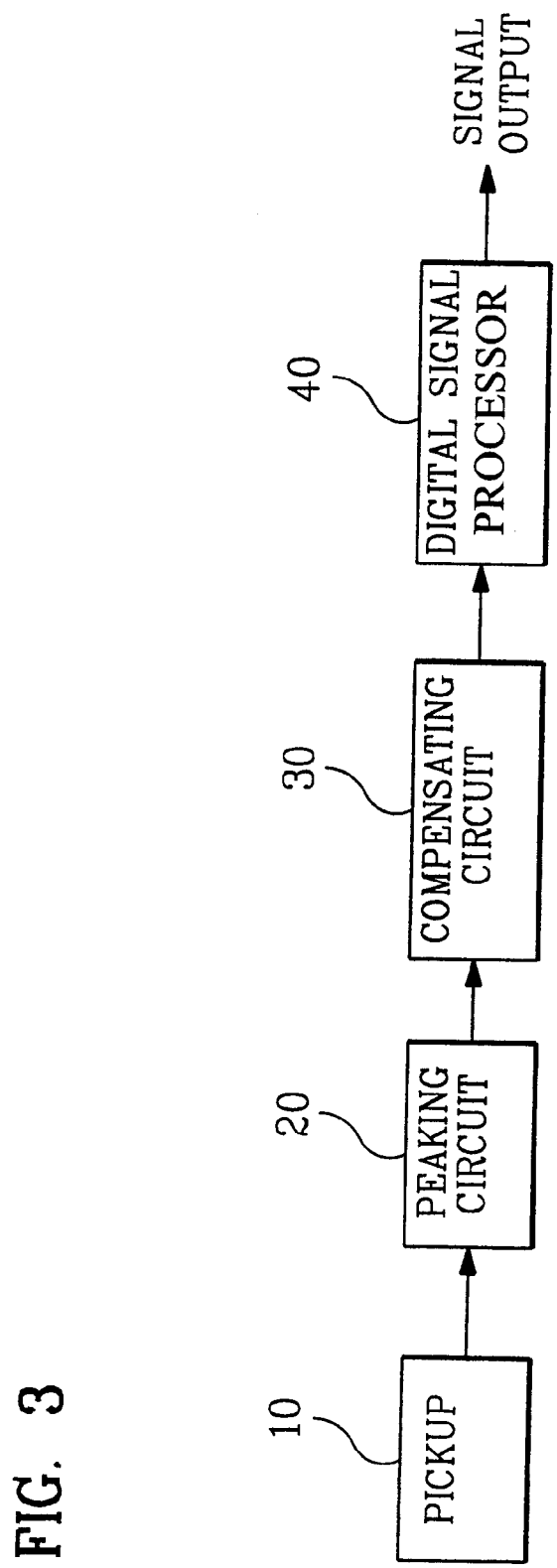
FIG. 3 is a block diagram showing the constitution of the optical recording/reproducing apparatus having a 3T component compensating circuit according to the present invention.

FIG. 3 is a block diagram showing the constitution of the optical recording/reproducing apparatus having a 3T component compensating circuit according to the present invention.

As shown in this drawing, the optical recording/reproducing apparatus according to the present invention includes: a pickup 10 for converting recorded images and audio data to output RF signals; a peaking circuit 20 for amplifying a 3T component from among the RF signals outputted from the pickup 10; a compensating circuit 30 for compensating the level of the 3T component output of the peaking circuit 20; and a digital signal processor 40 for carrying out error corrections for the output signals of the compensating circuit 30.

Now the optical recording/reproducing apparatus having a 3T component compensating circuit according to the present invention will be described in further detail referring to FIG. 4.

Figure 4:
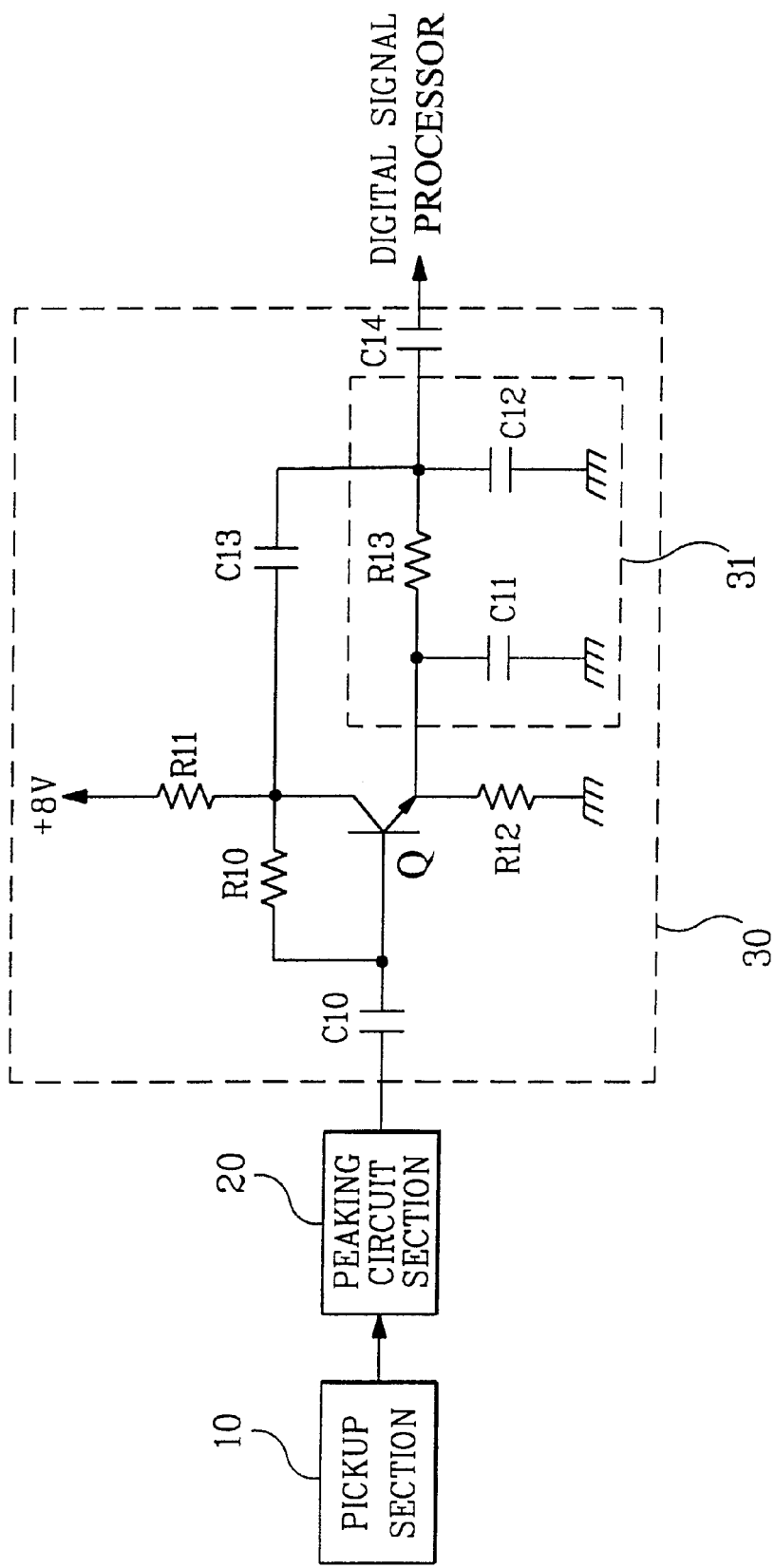
FIG. 4 is a circuit diagram showing an example of the apparatus of FIG. 3.

FIG. 4 is a circuit diagram showing an example of the apparatus of FIG. 3. The description will be made mainly based on the compensating circuit.

As shown in the drawing, in the reproduction signal compensating circuit 30, a self biased transistor Q has a base connected to an output terminal of the peaking circuit 20 for amplifying the 3T component from among output RF signals of the pickup 10. The transistor Q has a collector connected through a resistor R11 to a power source (+8V).

A resistor R10 is connected between the base and the collector of the transistor Q.

The transistor Q also has an emitter connected through a resistor R12 to ground, and connected to a low pass filter 31 consisting of capacitors C11 and C12 and a resistor R13.

A capacitor C13 is connected between the output of the low pass filter and the collector of the transistor Q for bypassing the 3T component.

In the drawing, capacitors C10 and C14 are blocking capacitors for removing the DC component.

The compensating circuit 30 according to the present invention constituted as above is described in detail as follows.

When the user inputs key signals, the recorded images and audio data are reproduced by the pickup 10 under the control of a microcomputer (not shown in the drawings) to be outputted as RF signals.

The RF signals which are outputted from the pickup section 10 are supplied to the peaking circuit 20 by which the 3T component from among the RF signals is amplified.

The level of the 3T component is level-shifted during the amplification by the peaking circuit 20 as described above.

This level-shifted 3T component is supplied through the capacitor C10 to the base of the transistor Q. Then the transistor Q operates based on the values of the resistors R11 and R12 which are connected to the collector and the emitter of the transistor Q respectively. Thus the ratio between upper and lower levels of the 3T component is adjusted to a ratio of 1:1.

Thereafter, the output signals of the collector of the transistor which have passed through the capacitor C13 for bypassing the 3T component, are combined with the output signals of the emitter of the transistor Q which have passed through the low pass filter 31. The 3T component thus amplified and compensated is supplied to the digital signal processor 40.

The digital signal processor 40 carries out error corrections by utilizing the 3T component of the incoming amplified and compensated RF signals.

According to the present invention as described above, the level-shifting of the 3T component of the output RF signals of the pickup is compensated for, so that the digital signal processor can carry out the optimum error corrections, and that the recorded images and audio data can be correctly reproduced.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An optical recording/reproducing apparatus having a 3T-component compensating circuit for reproducing recorded data, comprising:

a peaking circuit for amplifying a 3T component from among RF signals outputted from a pickup;

a compensating circuit for compensating a level-shifted 3T component shifted during amplification by said peaking circuit;

and a digital signal processor for carrying out error correction for the 3T component after compensation by said compensating circuit.

2. The optical recording/reproducing apparatus as claimed in claim 1, said compensating circuit comprising;

a self biased transistor having a base connected to an output terminal of said peaking circuit for amplifying the 3T component from among said output RF signals of said pickup;

said transistor having a collector connected through a resistor to a power source;

said transistor having an emitter connected to a low pass filter and a resistor connected to ground;

a capacitor connected between an output terminal of said low pass filter and said collector of said transistor for bypassing the 3T component, and said output terminal of said low pass filter being connector through a coupling capacitor to an input terminal of said digital signal processor.

3. The optical recording/reproducing apparatus as claimed in claim 2, said low pass filter comprising at least one capacitor and a resistor.

4. A compensating circuit for an optical recording/reproducing apparatus for reproducing recorded data, the compensating circuit comprising:

a transistor having a base connected to an output terminal of a peaking circuit of the recording/reproducing apparatus for amplifying a 3T component from among output RF signals output from a pickup connected to an input of said peaking circuit;

said transistor having a resistor connected between an emitter electrode and ground;

a low pass filter coupled to said emitter electrode;

a capacitor connected between an output terminal of sad low pass filter and said collector of sid transistor for bypassing the 3T component; and a coupling capacitor connected between said peaking circuit and said base of said transistor and another coupling capacitor connected said output terminal to an output terminal of said compensating circuit of said low pass filter.

5. The compensating circuit as claimed in claim 4, said low pass filter comprising at least one capacitor and a resistor.

6. The compensating circuit as claimed in claim 4, said low pass filter comprising at least two capacitors and a resistor connected in a pi ($\pi$) configuration.

* * * * *